United States Patent [19]

Belveal

[11] Patent Number: 4,755,099

[45] Date of Patent: Jul. 5, 1988

[54] PIVOTING LOAD TABLE FOR FORKLIFT

[75] Inventor: Shawn D. Belveal, Fresno, Calif.

[73] Assignee: The Dow Chemical Company, Midland, Mich.

[21] Appl. No.: 920,802

[22] Filed: Oct. 17, 1986

[51] Int. Cl.⁴ .......... B65G 7/00

[52] U.S. Cl. .......... 414/607; 414/665; 414/669; 414/911; 414/744 R; 414/283; 108/142; 104/47

[58] Field of Search .......... 414/607, 608, 659, 662, 414/663, 664, 665, 666, 667, 668, 669, 670, 911, 277, 283, 286, 744 R; 104/35, 45, 46, 47, 49; 108/142

[56] References Cited

U.S. PATENT DOCUMENTS

| | | | |
|---|---|---|---|
| 904,335 | 11/1908 | Lawry | 104/47 X |
| 1,244,373 | 10/1917 | Rice | 108/142 |
| 2,337,670 | 12/1943 | LeTourneau | 104/45 X |
| 2,410,373 | 10/1946 | Westervelt, Jr. | 414/607 |
| 2,479,623 | 8/1949 | Johnson | 414/607 |
| 2,957,594 | 10/1960 | Brenneman | 414/607 |
| 3,561,625 | 2/1971 | Dioguardi et al. | 104/47 X |
| 3,830,385 | 8/1974 | Young | 104/47 X |
| 4,272,220 | 6/1981 | Garcia | 414/607 |
| 4,416,202 | 11/1983 | Rooklyn | 104/35 X |

FOREIGN PATENT DOCUMENTS

| | | | |
|---|---|---|---|
| 198916 | 8/1958 | Austria | 414/672 |
| 648242 | 10/1962 | Italy | 414/666 |

*Primary Examiner*—Frank E. Werner
*Attorney, Agent, or Firm*—Norman L. Sims

[57] ABSTRACT

The invention is an apparatus for supporting a load on the forks of a forklift while such load is being moved, wherein the relationship of the direction the load is moved to the direction the forklift moves is an oblique angle, the apparatus comprising:

(A) a bottom member adapted with a means for attaching the apparatus to a forklift; and (B) a top member adapted for supporting a load, the top member pivotally attached to the bottom member, said top member adapted to pivot so as to support a load to be moved which must be moved in a direction which is at an oblique angle to the direction the forklift will move wherein the pivot point of the apparatus is located beyond the pivot point of a forklift when the apparatus is mounted on a forklift.

4 Claims, 4 Drawing Sheets

PIVOTING LOAD TABLE FOR FORKLIFT

BACKGROUND OF THE INVENTION

The invention relates to a device to be attached to the forks of the forklift, said device adapted for moving a load with a forklift wherein the direction that the forklift can be moved is not the same as the direction in which the load must be moved, and the angle between the two directions is oblique. The invention further relates to a method of moving such a load.

Often, loads must be removed from production machines wherein it is very difficult to move such a load with a standard forklift. In many cases, the movement of such a load must be done manually. Often this is done by one or more men, pulling or pushing a castering lift cart. Such manual movement of a load can be difficult and dangerous wherein the load is very heavy and thus, when loaded on the cart, the cart becomes very difficult to move. Such a procedure can result in undesired injuries in the workplace, for example, strained and twisted backs. In many industries, a finished product is taken up on a spindle, for example, large rolls of paper, carpet rolls, textiles, or plastic films. Many of these rolls can be very large. Some machines upon which these products are taken up on a spindle have one end of the spindle anchored with a pivot point while the other end of the spindle can be released from the machine and rotated out to allow sliding the roll of material off of the spindle. Many such machines only allow the spindle to pivot far enough to slide the load off the spindle. In many cases, it is very difficult to remove this load from the spindle using a forklift and thus, the aforementioned manual removal means are required. This can be very difficult because the product rolls can be very heavy, the manual cart on which the product rolls are placed can become very heavy, and the core upon which the product is wound may become crushed and provide further resistance in moving the rolled product off the spindle.

What is needed is a device and a method which allows the use of a standard forklift to move loads wherein the direction the load must be moved is at an oblique angle to the direction the forklift may be moved.

SUMMARY OF THE INVENTION

The invention is an apparatus for supporting a load on the forks of a forklift while such load is being moved, wherein the relationship of the direction the load is moved to the direction the forklift moves is an oblique angle, the apparatus comprising:

(A) a bottom member adapted with a means for attaching the apparatus to a forklift; and (B) a top member adapted for supporting a load, the top member pivotally attached to the bottom member, said top member adapted to pivot so as to support a load to be moved which must be moved in a direction which is at an oblique angle to the direction the forklift will move wherein the pivot point of the apparatus is located beyond the pivot point of a forklift when the apparatus is mounted on a forklift.

The device of this invention allows the use of a forklift to move a load which must be moved in a direction which is at an oblique angle to the direction at which a forklift can be moved to perform such a

DETAILED DESCRIPTION OF THE INVENTION

Figure 1:
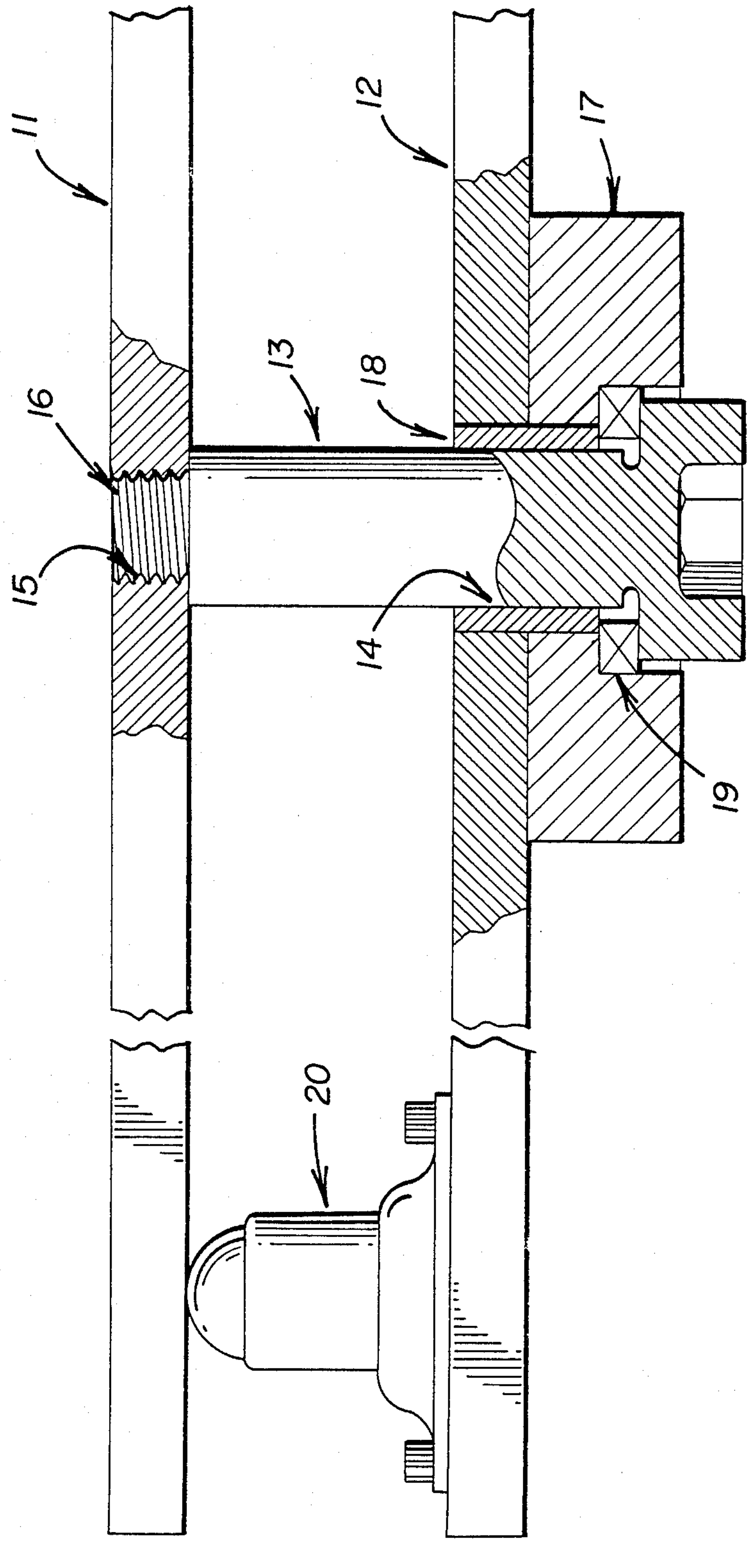
FIG. 1 is a cut away view of the pivotal attachment of the top member to the bottom member.

The base member functions primarily to attach the device to the forks of a forklift. In one embodiment, the base member can be a plate which has attached thereto channels adapted for fitting over the forks of a forklift and further adapted to allow firm attachment of the device to the forks of a forklift. The plate may be made of steel such as cold rolled steel, iron, or any other material suitable for the particular application. Preferably, the end of the bottom member closest to the forklift has rounded corners. One means of attaching the base member to the forks of a forklift is by use of set screws. Such set screws may be located in apertures in the channels such that when the set screws are tightened, they come in contact with the forks of a forklift and secure or fasten the device to the forks.

Pivotally attached to the bottom member is a top member which is adapted for supporting a load. This top member is adapted to pivot so as to support a load to be moved which must be moved in a direction which is at an oblique angle to the direction the forklift can move. The point of pivotal attachment of the bottom plate to the top plate is located such that the point is beyond the pivot point of the forklift when the device is attached to a forklift. This top member can be made of any material which has sufficient strength to support the loads to be moved. One preferred material of construction is steel. The top member preferably comprises two plates, a first plate which is pivotally attached, hereinafter pivot plate, to the bottom member, and a second plate attached to the first plate adapted for supporting the loads to be moved, hereinafter load bearing plate. The pivot and load bearing plates pivot concurrently. In one embodiment, the load bearing plate is attached to the pivot plate by means of bolts. In another embodiment, the load bearing plate is attached to the pivoting plate by welding. Preferably, the corners of the top member, or load bearing plate, which are closest to the forklift, are rounded to minimize pinch points caused by rotating of the top member. In one preferred embodiment, the top member has hingedly attached to each side flop down edge guards adapted for preventing loads from rolling or sliding off of the top member. The edge guards can be put in a down position in the same plane as the top member, during loading to facilitate unloading and can be raised up so that the edge guard sides are at a right angle to the top of the top member so as to function to prevent loads from sliding or rolling off of the top member during movement. In the embodiment wherein the top member comprises a pivot plate and a load bearing plate, the edge guards are hingedly attached to the load bearing plate. In one preferred embodiment, the end of the top member, or load bearing plate, furthest from the forklift is square and has a lip preferably with a rubber bumper to prevent the load from sliding off the end of the top member. Wherein the top member comprises a pivot plate and load bearing plate, it may be advantageous to put supports on the bottom of the load bearing plate so as to enhance the strength of the load bearing plate. Such supports can be "ribs" running the length of the load bearing plate, such ribs having an appropriate width for providing enhanced strength of the load bearing plate. Preferably, the top of the top member, or the load bearing plate, has ridges running the length of the top member, or load bearing plate, adapted to prevent a load from rolling or shifting. Such ridges are preferably triangular shaped with the base affixed to the top of the top member, or load bearing plate.

The means for pivotally attaching the top member to the bottom member can be any means which attaches the two members and which allows the top member to pivot in relationship to the bottom member. In one embodiment, the means of attachment can be a bolt running through both the top member and the bottom member. In one preferred embodiment, a shoulder bolt may be used. The pivotal attachment can further comprise bushings to provide lateral support. Further, a pivotal attachment can comprise a thrust bearing for axial support. As described hereinbefore, the pivot point of the device should be such that when the device is attached to the forks, the pivot is beyond the pivot point of the forklift. The pivot point of the forklift is the axis about which the forklift turns when it is moved in other than a straight line. The pivot point of the apparatus of this invention is the axis about which the top member rotates and is defined by the means for pivotally attaching the top member to the bottom member. What is meant by the pivot point of the turn table being beyond the pivot point of the forklift is that the two pivot points are offset and do not lie in the same vertical access, so that the forklift can pivot or move in a different direction than the top member of the apparatus of this invention. In many instances, the pivot point of the apparatus is beyond the forks of the forklift. The reason for this pivot offset is that often a load must be pivoted away from a particular point before it is moved in the direction it needs to be moved in. For example, in the situation where a roll of product is to be removed from a takeoff spindle, the roll must be pivoted away from the takeup machine before it is pulled from the spindle on which it is mounted.

In a preferred embodiment, the device further comprises a braking means adapted for preventing the top member from pivoting with relation to the bottom member when said brakes are applied. Once the load has been removed from the tight quarters and it is no longer necessary for the load to be moved at a direction different from the direction with which the forklift can be moved, it is advisable to apply such a braking means so as to prevent pivoting of the top member as such pivoting can result in the load falling or rolling off of the top member and creating a significant danger with respect to safety of those around and damage to the load to be moved. Any braking means which would prevent the turntable from pivoting when said braking means is applied is useful. In one example, a mechanical disc caliper brake system can be used and another embodiment, a pneumatic brake can be used. In the embodiment wherein a pneumatic braking means is used, a preferred means of incorporating the pneumatic braking means is as follows. In a preferred embodiment, one or more pneumatic cylinders with brake shafts therein are mounted in an inverted position to the bottom of the bottom member, for example, using a brake housing, with the brake shafts communicating through aperatures in the bottom member. To such pneumatic cylinders is attached a compressed air reservior with a control valve between the compressed air reservoir and the pneumatic cylinders adapted for controlling the flow of compressed air to the pneumatic cylinders. Further, the pneumatic braking means comprises brake pads mounted on each of the pneumatic cylinder shafts. Each brake shaft communicates through an aperature in the bottom plate with its brake pads in sufficient proximity to the top member that when the brakes are activated, the brake pads come in contact with the top member. Wherein the top member comprises a load bearing plate and a pivot plate, the brake pads will contact the pivot plate when the brakes are activated. Upon actuating the control valve, compressed air fills the pneumatic cylinders causing the brake pads to be pushed against the top member. When such pads are in contact with the top member, the top member will not pivot.

In a preferred embodiment, it may be desired to provide some means of enhancing the pivoting of the top member with respect to the bottom member. Any means which enhances the pivoting of the top member with respect to the bottom member and reduces the friction and strains in the system can be used. In one embodiment, a series of ball casters can be mounted on the top of the bottom member, under conditions such that the top member rests upon said ball casters. The ball casters function to allow the top member to pivot with respect to the bottom member with a minimum of friction and at the same time provide support to the top member. The number and arrangement of the ball casters is not critical and any number or arrangement which enhances pivoting and provides support to the top member may be used. In one preferred embodiment, the casters can be arranged in three concentric circles.

The device of this invention in conjuction with the forklift can be used in the following manner. The apparatus of the invention while secured to the forks of the forklift is maneuvered under the load to be moved using the forklift. The top member is raised to support the load to be moved. Thereafter the load to be moved is moved out of the tight quarters wherein the direction of motion of the load and the direction of the motion of the forklift are at oblique angles thereto. Once the load is removed from such a position, the load can be moved to a desired other position using the forklift with the device of the invention supporting the load. In that embodiment wherein the load is some product which has been taken up on a spindle winder, the method of using the invention is as follows. With the spindle still affixed at both ends to the winder, the forklift with the attachment of the invention affixed thereto is maneuvered under the roll to be removed, and the forks of the forklift are lifted until the top member of the device of this invention is supporting the roll. By maneuvering the forklift with the roll on the top member, one end of the spindle is rotated away from the winder machine, a distance sufficient such that the roll can be slid off of the spindle, using the forklift. Thereafter the forklift is maneuvered to slide the roll off the end of the spindle. The forklift is maneuvered to remove the roll from the vicinity of the winder. Once the roll is moved from the vicinity of the winder, then the roll and the forklift may be moved in the same direction. The braking means, wherein incorporated, then may be applied to prevent the top member from pivoting with respect to the forklift and the bottom member so as to prevent unnecessary forces on the load which may result in dropping the load. The load then can be moved to a desired location. The spindle may be returned to the position wherein it is fastened to the winder and made ready for further winding.

Figure 3:
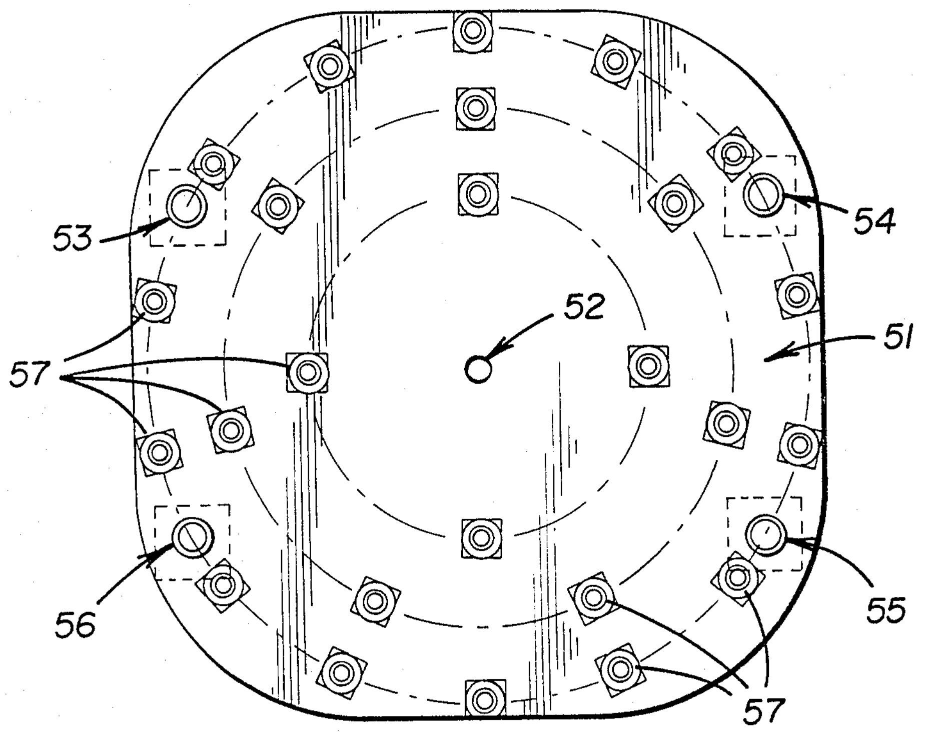
FIG. 3 is a top view of the bottom member.
Figure 2:
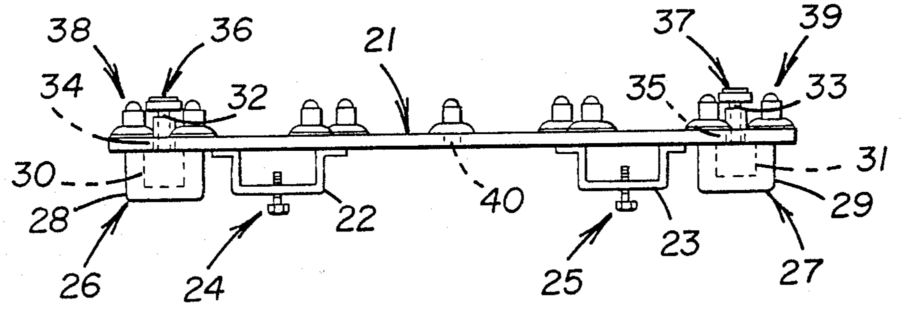
FIG. 2 is an end view of the bottom member.

By reference to the figures, one preferred embodiment of the apparatus described and claimed herein is described. FIG. 1 provides a cut-a-way view of the attachment of the pivot plate of the top member (11) to the bottom member (bottom plate) (12), using a shoulder bolt (13), wherein the shoulder bolt (13) is mounted in an inverted fashion such that the head of the bolt is below the bottom plate (12) with the body of the bolt communicating through an aperture (14) in the bottom plate (12). The pivot plate (11) is screwed on to the threads (16) of the bolt (13) by means of a threaded aperture (15) in the pivot plate (11). A register (17) adapted for holding a bushing (18) and thrust bearing (19) in place. Surrounding bolt (13) and between the bottom plate (12) and spacer (17) and bolt (13) is found a bushing (18). Between the head of the bolt and the spacer is found a thrust bearing (19). Bolted to the bottom plate (12) and in contact with the bottom of the pivot plate (11) is a ball caster (20). The appropriate spacing between the pivot plate (11) and the bottom plate (12) is achieved by use of a series of ball casters (20), illustrated by the ball caster (20). FIG. 2 is an end view of the bottom plate (21). The figure shows two channels (22 and 23) bolted to the bottom of the bottom plate (21), wherein said channels (22 and 23) are adapted to slide over the forks of the forklift. Through apertures in the bottom of each channel communicate set screws (24 and 25) adapted for securing the device to the forks of a forklift. Also illustrated are two pneumatic brakes (26 and 27). The brakes (26 and 27) are supported in brake housings (28 and 29) wherein the air cylinder bodies (30 and 31) are supported in the brake housings (28 and 29) and the air cylinder shafts (32 and 33) communicate through apertures (34 and 35) in the bottom plate (21) each brake has a brake pad (36 and 37) which when activated, will come in contact with the top member. Also shown are ball casters (38 and 39). The aperture through which the bolt to attach the top member to the bottom plate communicates is shown (40). FIG. 3 is a view looking down at the top of the bottom plate (51) the aperture (52) through which the means of pivotally attaching the top member to the bottom plate communicates is located in the center of the bottom member. Four brakes pads are found at each corner of the device (53, 54, 55 and 56). The figure also illustrates the arrangements of the ball casters (57) in a pattern of three concentric circles.

Figure 4:
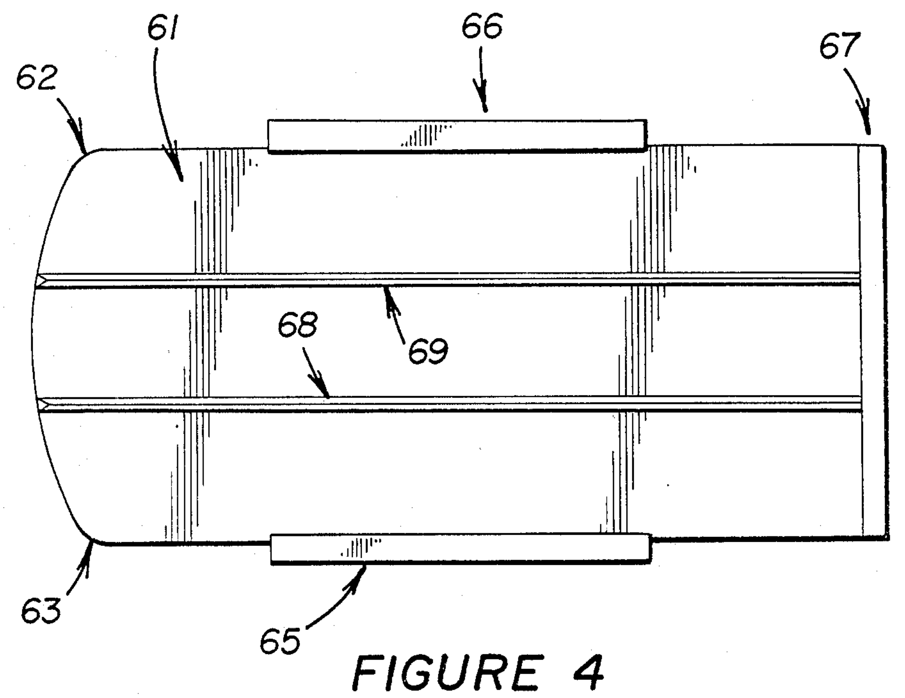
FIG. 4 is a top view of a portion of the top member.
Figure 5:
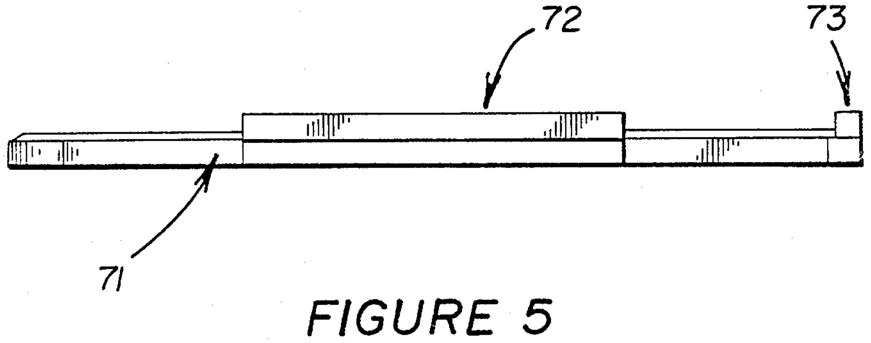
FIG. 5 is a side view of a portion of the top member.

FIG. 4 is the top view of the load bearing plate of a top member which comprises a plate (61) with rounded corners (62 and 63) which are adapted to be attached to the forklift in a manner such that the rounded corners are closest to the forklift. On each side of the load bearing plate are hingedly attached flop-down guards (65 and 66). At the end which is to be furthest away from the forklift is located a rubber bumper with a lip (67). The lip is adapted for preventing a load from sliding or rolling off the end of the load bearing plate and said rubber bumper adapted to provide cushion to prevent damage to anything which the end of the load bearing plate may come in contact with. Also visible from the top are ridged ribs (68 and 69) adapted to prevent the load from shifting while on the load bearing plate. FIG. 5 is the side view of the load bearing plate (71) with a flop down side-guard (72) and a rubber bumper with a lip (73).

Figure 6:
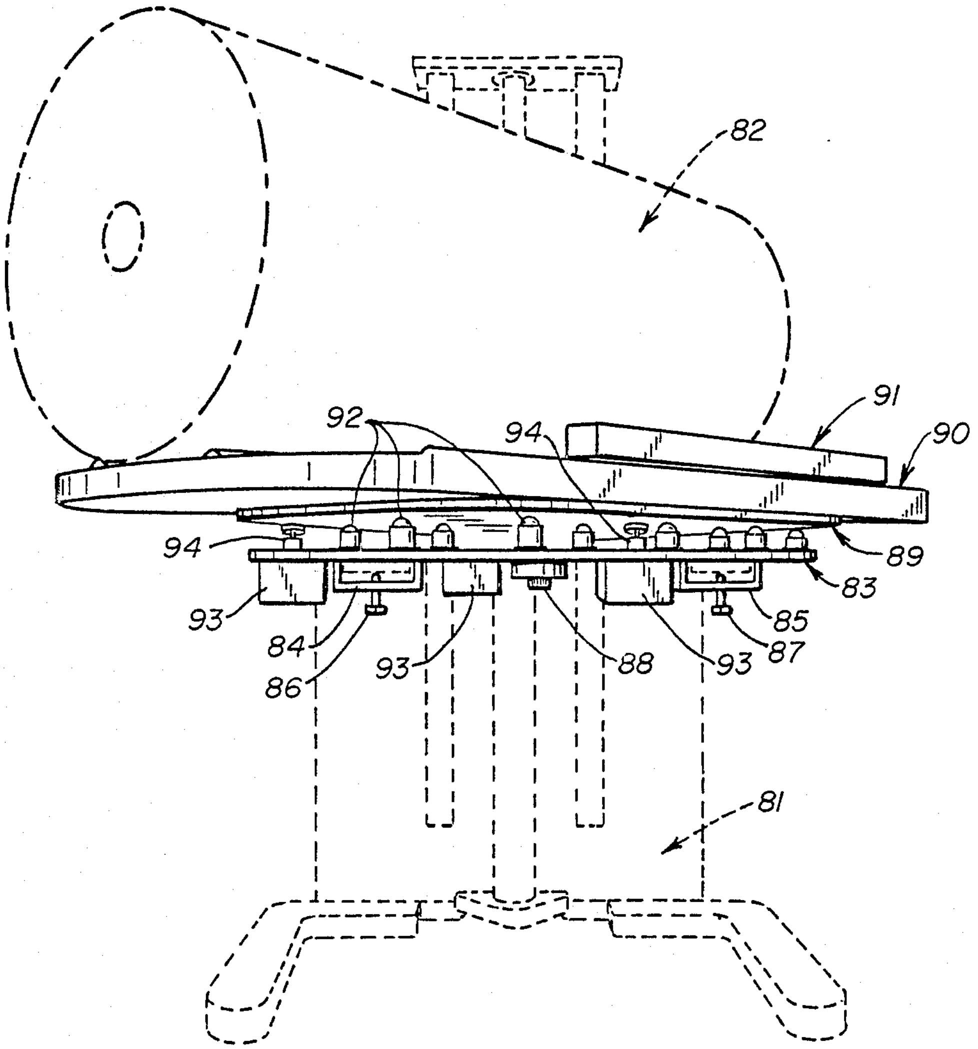
FIG. 6 is an end view of the apparatus mounted on a forklift.

FIG. 6 demonstrates an end view of the apparatus of this invention, wherein the apparatus is attached to a forklift truck (81) and the apparatus is supporting a load of a large roll of plastic (82). The figure illustrates the bottom member (83) to which the channels (84 and 85) are attached said channels adapted for attaching the apparatus to the forklift forks by means of set screws (86 and 87) communicating through aperatures in the channels (84 and 85). The head of the shoulder bolt (88) is shown, said bolt adapted for pivotally connecting the bottom member to the pivot plate (89) of the top member. Attached to the pivot plate (89), is the load bearing plate (90). The load bearing plate (90) has in the up position a hingedly attached side guard (91). Between the bottom member (83) and the pivot plate (89) are a number of ball casters (92) attached to the bottom member (83) wherein the pivot plate (89) rests on the casters (92). Also shown on the bottom of the bottom plate are three brake housings (93). Between the bottom member (83) and the pivot plate are illustrated two brake shafts (94), said brake shafts (94) located directly above the brake housings (93).

What is claimed is:

1. Apparatus for supporting a load on the forks of a forklift while such load is being moved, wherein the relationship of the direction the load is moved to the direction the forklift moves is an oblique angle, the apparatus comprising:

(A) a bottom member adapted with a means for attaching the apparatus to a forklift; and (B) a top member adapted for supporting a load, the top member pivotally attached to the bottom member, allowing said top member to pivot so as to support a load to be moved which must be moved in a direction which is at an oblique angle to the direction the forklift will move wherein the pivot point of the apparatus is located beyond the ends of the forks of a forklift when the apparatus is mounted on a forklift, wherein the top member comprises (1) a pivoting plate which is pivotally attached to the bottom member and adapted to pivot about the pivot point of the apparatus; and (2) a load bearing plate affixed to the pivoting plate adapted for supporting a load and which is affixed to the pivoting plate in a manner such that the load bearing plate pivots with the pivot plate, wherein the load bearing plate of the top member comprises (a) a plate with two straight sides, the end closest to the forklift having rounded corners, the end opposite the forklift being straight;

(b) with a lip on the end opposite the forklift when attached to a forklift adapted to prevent a load from rolling or sliding off the end; and (c) hingedly attached members on each side adapted such that the hingedly attached members lie in the same plane as the plate in one position, and in the other position form a lip at a right angle to the plate, said lip adapted to prevent a load from rolling or sliding off the side of the plate;

(C) a braking means attached to the bottom member on the top member and having surfaces that are vertically movable to frictionally engage respectively, the underside of the pivoting plate on the top side of the bottom member for preventing the top member from pivoting when the braking means is applied.

2. The apparatus of claim 1 wherein the base member has apppended thereto two channel members adapted for fitting about the forks of a forklift and for securing the apparatus to the forks of the forklift.

3. The apparatus of claim 2 wherein the top member is pivotally attached to the bottom member by means of a bolt, a bushing, and a thrust bearing.

4. The apparatus of claim 3 wherein one or more ball casters are attached to the bottom member, and the top member rests on the casters wherein the casters facilitate the pivoting of the top member.

* * * * *

UNITED STATES PATENT AND TRADEMARK OFFICE
CERTIFICATE OF CORRECTION

PATENT NO. : 4,755,099

DATED : July 5, 1988

INVENTOR(S) : Shawn D. Belveal

It is certified that error appears in the above-identified patent and that said Letters Patent is hereby corrected as shown below:

Col. 1, line 68, after "a" insert -- removal. --;

Col. 4, line 4, "reservoir" has been misspelled;

Col. 6, line 67, delete "on" and insert -- or --;

Col. 7, line 1, delete "on" and insert -- or --.

Signed and Sealed this

Thirty-first Day of January, 1989

*Attest:*

DONALD J. QUIGG

*Attesting Officer*

*Commissioner of Patents and Trademarks*